United States Patent Office 2,963,502
Patented Dec. 6, 1960

2,963,502
BIS(2,6-DIISOPROPYLPHENOXY)-DIMETHYLSILANE

Glenn R. Wilson, Detroit, Mich., assignor to Ford Motor Company, Dearborn, Mich., a corporation of Delaware No Drawing. Filed May 26, 1958, Ser. No. 737,489

1 Claim. (Cl. 260—448.8)

This invention relates to the field of synthetic lubricants and more particularly to a silane lubricant which is useful at temperatures at least as high as 392° F. and has been used to 500° F. without appreciable pyrolytic decomposition.

Chemically this lubricant is bis(2,6-diisopropylphenoxy) dimethylsilane. Structurally this compound may be represented as:

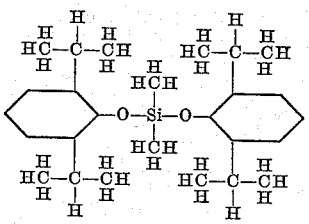

This compound was prepared as follows: The sodium salt of 2,6-diisopropylphenol was prepared by reacting 178.3 g. (1 mole) of the phenol with 21 g. (0.9 g. atom) of sodium metal in 500 ml. of dry tetrahydrofuran under an atmosphere of nitrogen. Fifty-eight g. (0.45 mole) of dimethyldichlorosilane was added to the solution of the phenoxide and the resulting mixture refluxed for four hours. The precipitated sodium chloride is removed by filtration or centrifugation, the solvent removed and the residue distilled at reduced pressure. The fraction collected at 170–185° C.—2 mm. solidified upon cooling (100 g.) and melted at 85–91° C. After crystallizing from petroleum ether the product melted at 85–89° C. and after recrystallization from methanol melted at 89.5–90° C.

The compound was analyzed for carbon and hydrogen and found to contain 75.84 percent carbon and 9.55 percent hydrogen. The corresponding theoretical values are 75.67 percent carbon and 9.77 percent hydrogen.

As a check upon the synthesis the following synthesis was performed: One mole of methylmagnesium bromide in ether was added to 178.3 g. (1 mole) of 2,6-diisopropylphenol in one liter of tetrahydrofuran under nitrogen followed by the addition of 129.1 g. of dimethyldichlorosilane and the resulting mixture was stirred overnight. Dilute hydrochloric acid was added to the mixture to remove the magnesium salts and the ether layer concentrated on a steam bath. Upon cooling the residue partially solidified and after filtration the solid portion melted at 89–90° C. Crystallization from methanol yielded 78 g. of a white crystalline compound that melted at 89–89.5° C. No melting depression was noted when this material was mixed with that obtained from the sodium salt.

This material was checked in the Shell Four Ball Wear Tester for wear at high temperatures with the following results:

[Test conditions: 600 r.p.m.]

| Compound | Wear Scar Diameter (mm.) | | | |
|---|---|---|---|---|
| | 10 kg. load | | 40 kg. load | |
| | 392 F. | 500 F. | 392 F. | 500 F. |
| Diphenoxy dimethylsilane | [1] 0.57 | | | |
| bis(2,6-dimethylphenoxy) dimethylsilane | [1] 0.38 | | | |
| bis(2,6-diisopropylphenoxy) dimethylsilane | [2] 0.41 | [2] 0.35 | | [2] 0.68 |

[1] Five minutes duration.
[2] One hour duration.

It will be noted that in the above table tests of diphenoxy dimethylsilane and bis(2,6-dimethylphenoxy) dimethylsilane were made for sake of comparison.

The bis(phenoxy)- and bis(2,6-dimethylphenoxy) derivatives showed decomposition during the test period, (strong odor of phenol), whereas, the bis(2,6-diisopropylphenoxy)-derivative discolored slightly and no change in melting point was noted after the test at 392 F. and 500 F.

I claim as my invention:

A pyrolysis resistant high temperature lubricant consisting essentially of bis(2,6-diisopropylphenoxy) dimethylsilane.

References Cited in the file of this patent

UNITED STATES PATENTS 2,701,803    Orkin _____ Feb. 8, 1955

FOREIGN PATENTS 955,062    Germany _____ Dec. 27, 1956

OTHER REFERENCES

Larsson: "Chem. Ber.," vol. 86 (1953), pp. 1382–3.